United States Patent
Irie et al.

(10) Patent No.: US 10,639,970 B2
(45) Date of Patent: May 5, 2020

(54) VEHICLE FRONT QUARTER GLASS

(71) Applicant: AGC INC., Tokyo (JP)

(72) Inventors: Tetsuji Irie, Tokyo (JP); Nana Sato, Tokyo (JP)

(73) Assignee: AGC INC., Tokyo (JP)

(*) Notice: Subject to any disclaimer, the term of this patent is extended or adjusted under 35 U.S.C. 154(b) by 0 days.

(21) Appl. No.: 16/549,651

(22) Filed: Aug. 23, 2019

(65) Prior Publication Data
US 2019/0375276 A1    Dec. 12, 2019

Related U.S. Application Data

(63) Continuation of application No. PCT/JP2018/008494, filed on Mar. 6, 2018.

(30) Foreign Application Priority Data

Apr. 4, 2017  (JP) .................... 2017-074700

(51) Int. Cl.
*B60J 1/00*    (2006.01)
*B32B 17/06*   (2006.01)
(Continued)

(52) U.S. Cl.
CPC .............. *B60J 1/002* (2013.01); *B32B 17/064* (2013.01); *B60J 1/02* (2013.01); *B60R 1/001* (2013.01); *C03C 17/32* (2013.01); *C03C 17/42* (2013.01)

(58) Field of Classification Search
CPC ....... B60J 1/002; B60J 1/02; B60J 1/10; B60J 1/00; C03C 17/42; C03C 17/32; B60R 1/001; B32B 17/064; B60S 1/02
(Continued)

(56) References Cited

U.S. PATENT DOCUMENTS 4,959,270 A * 9/1990 Hasegawa ......... B32B 17/10174
                                                    428/426
5,414,240 A * 5/1995 Carter ............... B32B 17/10036
                                                    219/203
(Continued)

FOREIGN PATENT DOCUMENTS

JP      2016168996 A  *  9/2016  .............. B60S 1/023
WO   WO-2006112529 A1 * 10/2006  .............. B60S 1/023
(Continued)

OTHER PUBLICATIONS

English Translation of the Written Opinion for PCT/JP2018/008494 (4 pages). (Year: 2019).*
(Continued)

*Primary Examiner* — Rodney Mintz
(74) *Attorney, Agent, or Firm* — Foley & Lardner LLP

(57) ABSTRACT

A front quarter glass includes a window plate, a frame-like black ceramic layer on a peripheral portion of an interior side surface, and an anti-fogging film provided in a region excluding an entire peripheral portion of the window plate. A boundary is between the regions where the anti-fogging film is provided and not provided, has no perspective distortion, and has a boundary line of 10-200 μm that is visually recognized by scattering of incoming light. An outer periphery of the anti-fogging film is located is located 8 mm (0.31 inch) inside from an inner periphery of the black ceramic layer in a first region. The first region is to less than 50% of an entire inner periphery including a lower front portion. The outer periphery of the anti-fogging film is located 8-35 mm (0.31-1.38 inches) inside the inner periphery of the black ceramic layer in a second region excluding the first region.

7 Claims, 10 Drawing Sheets

(51) Int. Cl.
  *B60J 1/02* (2006.01)
  *B60R 1/00* (2006.01)
  *C03C 17/32* (2006.01)
  *C03C 17/42* (2006.01)

(58) Field of Classification Search
  USPC .................................................. 52/171.2
  See application file for complete search history.

(56) References Cited

U.S. PATENT DOCUMENTS

| | | | |
|---|---|---|---|
| 7,880,120 B2* | 2/2011 | Schmidt | B32B 17/10036 219/203 |
| 9,481,228 B2* | 11/2016 | Ishioka | B60J 1/002 |
| 10,507,709 B2* | 12/2019 | Irie | B32B 7/12 |
| 2009/0044464 A1* | 2/2009 | Schmidt | B32B 17/10385 52/171.2 |
| 2009/0239017 A1* | 9/2009 | Ishioka | B32B 17/10036 428/38 |
| 2013/0260145 A1* | 10/2013 | Kishikawa | C03C 17/3405 428/337 |
| 2015/0210144 A1 | 7/2015 | Ishioka | |
| 2017/0015863 A1 | 1/2017 | Kodaira et al. | |
| 2018/0215240 A1* | 8/2018 | Irie | C03C 17/326 |
| 2019/0047378 A1* | 2/2019 | Yamada | B60J 1/00 |
| 2019/0375275 A1* | 12/2019 | Irie | B32B 7/12 |

FOREIGN PATENT DOCUMENTS

| | | |
|---|---|---|
| WO | WO-2014/061509 A1 | 4/2014 |
| WO | WO-2015052933 A1 * | 4/2015 |
| WO | WO-2015/152049 A1 | 10/2015 |

OTHER PUBLICATIONS

International Searching Authority, "International Search Report," issued in connection with International Patent Application No. PCT/JP2018/008494, dated May 15, 2018.

International Searching Authority, "Written Opinion," issued in connection with International Patent Application No. PCT/JP2018/008494, dated May 15, 2018.

* cited by examiner

VEHICLE FRONT QUARTER GLASS

CROSS REFERENCE TO RELATED APPLICATION

This is a bypass continuation of International Patent Application No. PCT/JP2018/008494, filed on Mar. 6, 2018, which claims priority to Japanese Patent Application No. 2017-074700, filed on Apr. 4, 2017. The contents of these applications are hereby incorporated herein in their entireties by reference.

BACKGROUND

The present invention relates to a vehicle front quarter glass.

BACKGROUND ART

Conventionally, it is known that a glass provided with an anti-fogging film is used as a vehicle window glass. In such a glass, the anti-fogging film that includes, for example, a water-absorbing resin layer is provided on a surface of a glass plate and the anti-fogging film thus absorbs and removes tiny water droplets that could cause fogging.

Techniques for using such a glass provided with an anti-fogging film for a vehicle windshield or a door glass are being developed, for example. International Patent Publication No. WO2014/061509 discloses a windshield that can simply and reliably let a driver recognize an occurrence status of fogging by utilizing a difference in the anti-fogging performance associated with the magnitude of the film thickness of the anti-fogging film.

International Patent Publication No. WO2015/152049 describes technology for a glass provided with an anti-fogging film that excels in abrasion resistance. In this glass, a silica-based overcoat layer is provided on a water-absorbing resin layer, and thus the glass can withstand the use for, for example, a door glass that is lifted up and down frequently.

Meanwhile, as in the case of a windshield and a door glass, anti-fogging performance is being expected for a vehicle front quarter glass as well. However, there has yet been no known glass provided with an anti-fogging film that meets the specifications suitable for a vehicle front quarter glass.

SUMMARY

When an anti-fogging film is to be provided in a front quarter glass, if a region where the anti-fogging film is formed includes a portion that overlaps a black ceramic layer provided in a peripheral portion of the front quarter glass, the durability becomes insufficient. If the end portion of the anti-fogging film is located on an inner side of a region where the black ceramic layer is formed, perspective distortion may arise.

The present invention has been made in view of the above and is directed to providing a vehicle front quarter glass provided with an anti-fogging film, in which the anti-fogging film is durable and a boundary between a region where the anti-fogging film is formed and a region where no anti-fogging film is formed within a see-through region has little influence on visibility.

Solution to Problem

The present invention provides a vehicle front quarter glass having the following configuration.

A vehicle front quarter glass according to the present invention includes a window plate, a frame-like black ceramic layer provided in a peripheral portion of a vehicle interior side surface of the window plate as viewed in a front view, and an anti-fogging film provided in a region excluding an entire peripheral portion of the window plate as viewed in the front view. A boundary between a region where the anti-fogging film is provided and a region where the anti-fogging film is not provided has no perspective distortion and is formed by a boundary line having a linewidth of 10-200 µm, (0.000393701-0.00787402 inches), the boundary line being visually recognized by scattering of incoming light. An outer periphery of the anti-fogging film is located on an outer side of a position that is located 8 mm (0.31 inch) inside from an inner periphery of the black ceramic layer in a first region, and the first region includes an area that is located in a lower front portion when the vehicle front quarter glass is installed in a vehicle and corresponds to less than 50% of an entire inner periphery of the black ceramic layer. The outer periphery of the anti-fogging film is located 8-35 mm (0.31-1.38 inches) inside the inner periphery of the black ceramic layer in a second region, and the second region is the entire inner periphery of the black ceramic layer excluding the first region.

The present invention can provide a vehicle front quarter glass provided with an anti-fogging film, in which the anti-fogging film is durable and a boundary between a region where the anti-fogging film is formed and a region where no anti-fogging film is formed within a see-through region has little influence on visibility.

The above and other objects, features and advantages of the present disclosure will become more fully understood from the detailed description given hereinbelow and the accompanying drawings which are given by way of illustration only, and thus are not to be considered as limiting the present disclosure.

DESCRIPTION OF EMBODIMENTS

Hereinafter, specific embodiments of a vehicle front quarter glass according to the present invention will be described with reference to the drawings. The vehicle front quarter glass is also referred to as a front quarter glass, hereinafter.

In the present specification, the expressions "upper," "lower," "front," and "rear" refer to, respectively, the upper side, the lower side, the front side, and the rear side held when the front quarter glass is installed in a vehicle. An "upper portion" of the front quarter glass is an upper-side portion thereof held when the front quarter glass is installed in a vehicle, and a "lower portion" of the front quarter glass is a lower-side portion thereof held when the front quarter glass is installed in a vehicle.

In the present specification, a peripheral portion of a front quarter glass refers to a region of the front quarter glass extending from the edge toward a center portion of a principal surface of the front quarter glass, and this region has a certain width. In the present specification, the side toward the outer periphery relative to the center portion of the principal surface of the front quarter glass is referred to as an "outer side," and the side toward the center portion relative to the outer periphery is referred to as an "inner side." With regard to the expression "substantially," in the present specification, the expression "substantially center," for example, is to be understood to be a center as determined by human visual perception. In other cases as well, the expression "substantially" has a meaning similar to the above. In the present specification, a symbol "-" indicating a numerical range means that the range includes the upper and lower limits.

Figure 1:
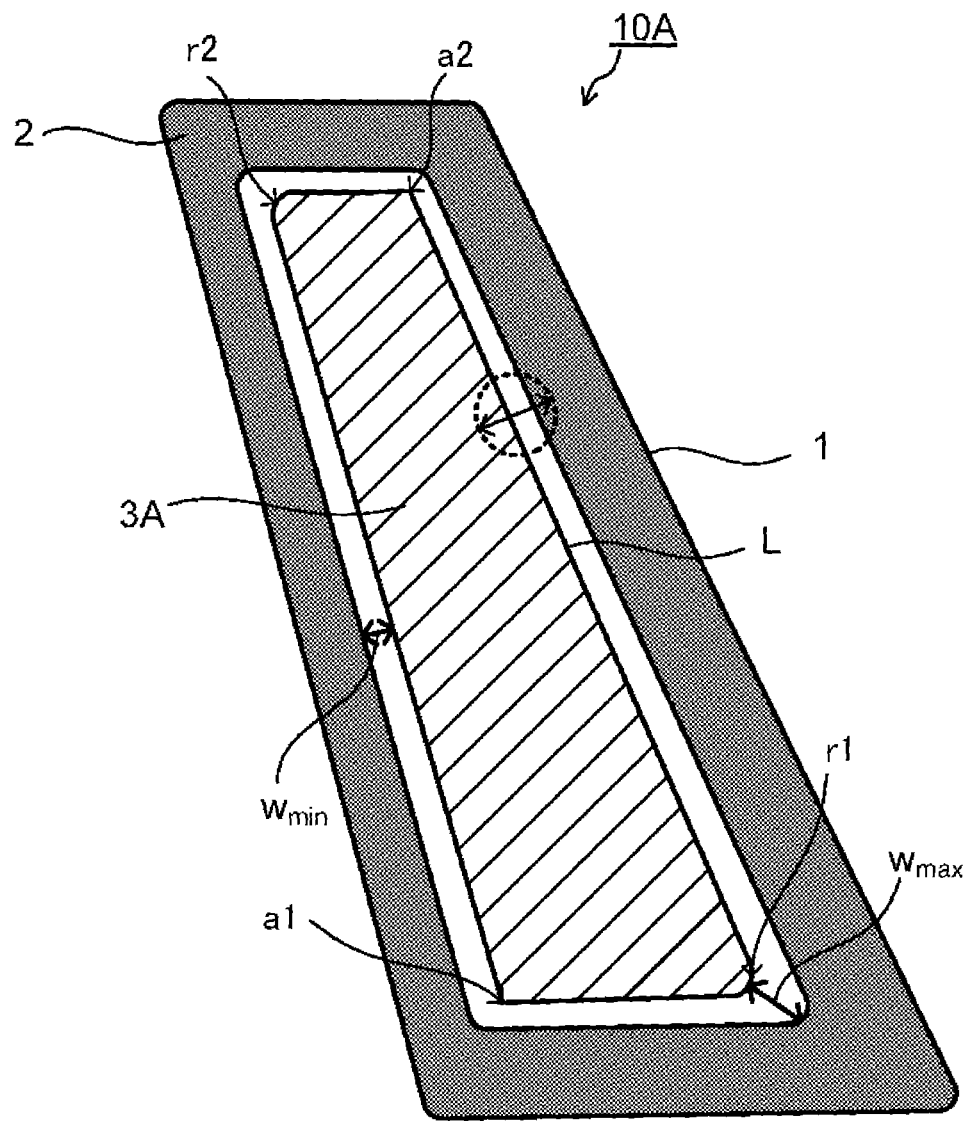
FIG. 1 is a configuration diagram of an example of an embodiment of a vehicle front quarter glass according to the present invention.
Figure 2:
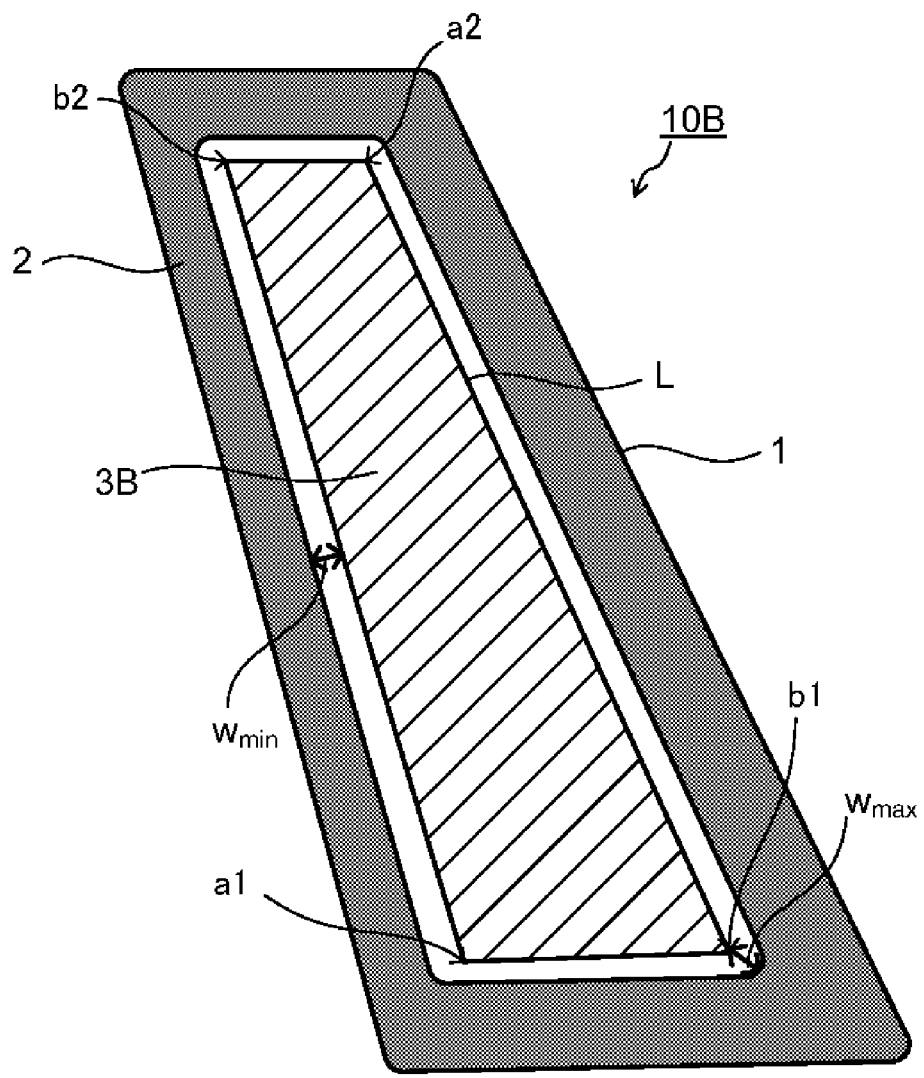
FIG. 2 is a configuration diagram of another example of an embodiment of a vehicle front quarter glass according to the present invention.
Figure 3:
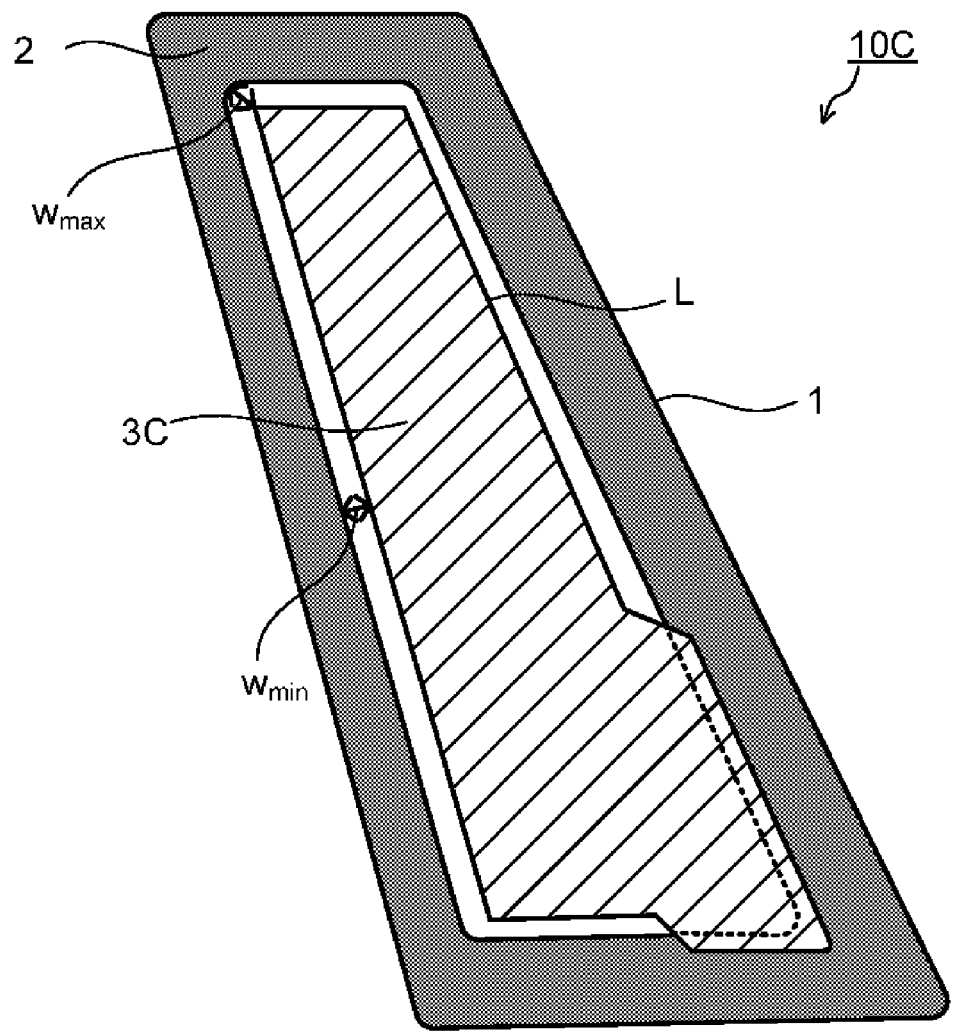
FIG. 3 is a configuration diagram of another example of an embodiment of a vehicle front quarter glass according to the present invention.
Figure 4:
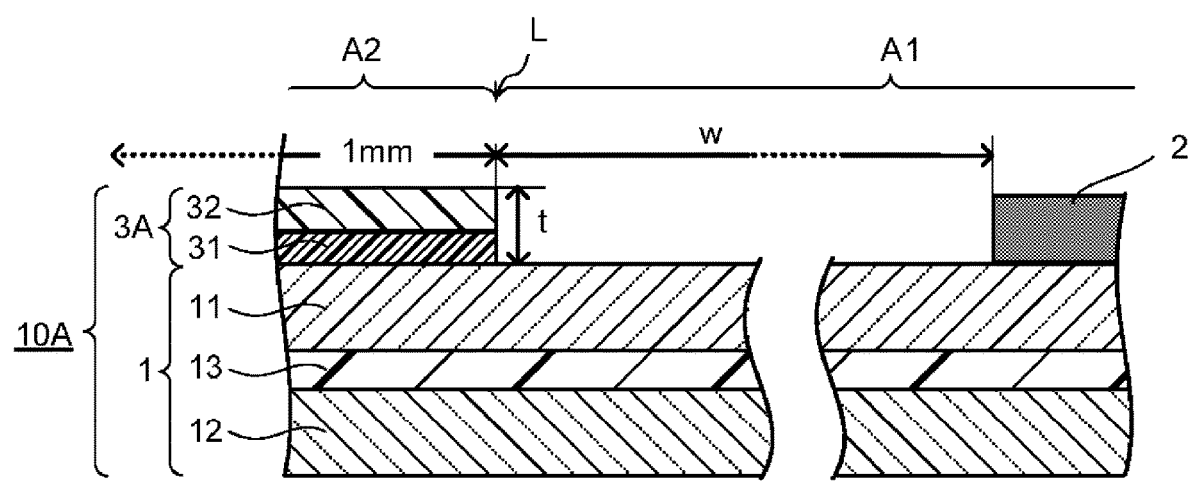
FIG. 4 is an enlarged sectional view of the vehicle front quarter glass illustrated in FIG. 1, taken in the vicinity of a boundary line L.

FIG. 1 is a configuration diagram of an example of an embodiment of a front quarter glass according to the present invention. FIGS. 2 and 3 are each a configuration diagram of another example of an embodiment of a front quarter glass, different from the one illustrated in FIG. 1, according to the present invention. FIGS. 1 to 3 are each a front view in which the front quarter glass installed in a vehicle is viewed from the vehicle interior side. FIG. 4 is an enlarged sectional view of the front quarter glass illustrated in FIG. 1, taken in the vicinity of a boundary line (i.e., an enlarged sectional view taken along a plane extending in the direction of the double-headed arrow within the dotted circle indicated in FIG. 1). In each of the front views illustrated in FIGS. 1 to 3, the upper side of the drawing corresponds to the upper side of the front quarter glass held when the front quarter glass is installed in a vehicle, and the right side of the drawing corresponds to the front side of the front quarter glass held when the front quarter glass is installed in a vehicle.

A front quarter glass 10A illustrated in FIG. 1 includes a window plate 1, a black ceramic layer 2, and an anti-fogging film 3A. The window plate 1 has a substantially trapezoidal outer peripheral shape as viewed in the front view. The black ceramic layer 2 is provided on a surface of the window plate 1 that faces the vehicle interior (hereinafter, also referred to as a "vehicle interior side surface"). The black ceramic layer 2 is formed throughout a peripheral portion of the window plate 1 on the vehicle interior side surface and is a frame-like layer as viewed in the front view.

The black ceramic layer 2 has a substantially trapezoidal outer periphery that coincides with the outer periphery of the window plate 1. The black ceramic layer 2 has a substantially trapezoidal inner periphery that is a reduced shape of the outer peripheral shape. The anti-fogging film 3A has a substantially trapezoidal outer peripheral shape that substantially coincides with a shape obtained by reducing the inner peripheral shape of the black ceramic layer 2.

In the front quarter glass 10A, a region where the black ceramic layer 2 is formed is a region that blocks at least visible light rays and is provided in order to conceal a portion that needs to be concealed, such as a portion of the front quarter glass 10A that is attached to a vehicle body. The degree of blocking visible light rays in the shading region where the black ceramic layer 2 is formed may be so adjusted as not to allow the visible light rays to pass therethrough to an extent that at least the portion that needs to be concealed can be concealed.

The frame-like black ceramic layer 2 formed throughout the peripheral portion of the window plate 1 may have such a width that can conceal the portion that needs to be concealed, and this width can be adjusted in accordance with the vehicle type of the vehicle to be used. It is not necessary that the black ceramic layer 2 have an equal width on the upper, lower, right, and left sides. It is not necessary either that a given side have a constant width from one end to the other end. Typically, each side has a substantially equal width.

In the front quarter glass 10A, the entire region of the window plate 1 excluding the shading region where the black ceramic layer 2 is formed is a see-through region. In the front quarter glass 10A, the entire outer periphery of the anti-fogging film 3A is located in the see-through region on an inner side of the inner periphery of the black ceramic layer 2. The distance between the outer periphery of the anti-fogging film 3A and the inner periphery of the black ceramic layer 2 is 8-35 mm (0.31-1.38 inches) in a region corresponding to the entire inner periphery of the black ceramic layer 2. In other words, in the front quarter glass 10A, the outer periphery of the anti-fogging film 3A is located 8-35 mm (0.31-1.38 inches) inside from the inner periphery of the black ceramic layer 2 in the region corresponding to the entire inner periphery of the black ceramic layer 2.

In the front quarter glass according to the present invention, the outer periphery of the anti-fogging film and the inner periphery of the black ceramic layer mainly have a positional relationship as in a second region described below and may have a positional relationship as in a first region described below, as desired, at a predetermined position and in a predetermined proportion. The second region is a region where the outer periphery of the anti-fogging film is located 8-35 mm (0.31-1.38 inches) inside from the inner periphery of the black ceramic layer. The first region is a region where the outer periphery of the anti-fogging film is located on an outer side of a position that is located 8 mm (0.31 inch) inside from the inner periphery of the black ceramic layer.

In the front quarter glass according to the present invention, if the first region is present, the first region is present in a region corresponding to less than 50% of the entire inner periphery of the black ceramic layer. Specifically, in the front quarter glass according to the present invention, the second region takes up a region corresponding to more than 50% but no more than 100% of the entire inner periphery of the black ceramic layer, and the first region takes up a region corresponding to no less than 0% but less than 50% of the entire inner periphery of the black ceramic layer.

If the first region is provided, the first region is preferably present along no less than 1% of the entire inner periphery of the black ceramic layer, more preferably present along no less than 3% of the entire inner periphery, even more preferably present along no less than 5% of the entire inner periphery, or particularly preferably present along no less than 10% of the entire inner periphery. When the first region is present along no less than 1% of the entire inner periphery, the visibility through a lower front portion can be increased. The first region is preferably present along no more than 45% of the entire inner periphery of the black ceramic layer or more preferably present along no more than 40% of the entire inner periphery.

Accordingly, the front quarter glass according to the present invention includes a mode in which a region corresponding to the entire inner periphery (100%) of the black ceramic layer is the second region and no first region is provided. The front quarter glass 10A is an example of such an embodiment in which the region corresponding to the entire inner periphery of the black ceramic layer is the second region and no first region is provided.

If the front quarter glass according to the present invention includes the first region, the first region includes a lower front portion of the front quarter glass, as in the front quarter glass illustrated in FIG. 3, for example. The lower front portion of the front quarter glass refers to a region corresponding to a lower portion of a front side of the inner periphery of the black ceramic layer. Specifically, the lower front portion corresponds to a region extending upward from a corner portion where the lower side and the front side of the inner periphery of the black ceramic layer meet to a position that is substantially one half of the front side. In the front quarter glass according to the present invention, the first region may include at least a portion of the lower front portion.

In the front quarter glass 10A, the distance between the outer periphery of the anti-fogging film 3A and the inner periphery of the black ceramic layer 2 is no less than 8 mm (0.31 inch) from the viewpoint of workability in forming the anti-fogging film. In addition, from the viewpoint of ensuring high visibility in the see-through region by suppressing an occurrence of fogging, the distance between the outer periphery of the anti-fogging film 3A and the inner periphery of the black ceramic layer 2 is no more than 35 mm (1.38 inch) or preferably no more than 20 mm (0.79 inch.).

In the front quarter glass 10A, with only the second region being provided, the anti-fogging film 3A and the black ceramic layer 2 have no overlapping region, or there is no region where the outer periphery of the anti-fogging film 3A and the inner periphery of the black ceramic layer 2 are too close to each other. Thus, a highly durable anti-fogging film 3A is achieved.

In the front quarter glass according to the present invention, when a region corresponding to more than 50% of the entire inner periphery of the black ceramic layer is the second region, no practical problem arises in the durability of the anti-fogging film. When the front quarter glass according to the present invention includes the first region including the lower front portion, as compared to the front quarter glass according to the embodiment that includes only the second region, the area of the anti-fogging film in the visible region can be increased, and thus this configuration is advantageous in terms of the anti-fogging performance. Since the first region is so provided as to include the lower front portion that has more influence on the field of view, the presence of the first region is advantageous in that a broad field of view can be maintained even under a condition where fogging may arise. In the front quarter glass according to the present invention, the proportions of the first region and the second region are selected as appropriate within the above-described ranges in consideration of the balance between the durability and the anti-fogging performance required for the anti-fogging film in the front quarter glass.

As illustrated in FIG. 1, in the front quarter glass 10A, the outer periphery of the anti-fogging film 3A includes no corner portion having an interior angle of no more than 90 degrees. Specifically, the outer periphery of the anti-fogging film 3A is formed by a straight line in a portion where the inner periphery of the black ceramic layer 2 is linear, so that the distance between the outer periphery of the anti-fogging film 3A and the inner periphery of the black ceramic layer 2 is substantially constant. In addition, at a portion where the interior angle to be obtained when two adjacent sides meet is no more than 90 degrees, the two sides are so connected as to have a curvature shape as indicated by r1 or r2. Furthermore, at a portion where the interior angle to be obtained when two adjacent sides meet exceeds 90 degrees, the two sides are so connected as to have straight lines intersect with each other as indicated by a1 or a2.

When the distance between the outer periphery of the anti-fogging film 3A and the inner periphery of the black ceramic layer 2 is denoted by W, a minimum value that W can take is denoted by $W_{min}$, and a maximum that W can take is denoted by $W_{max}$, $W_{min}$ lies in a region corresponding to a straight line portion of the inner periphery of the black ceramic layer 2. Meanwhile, $W_{max}$ lies on r1 (lower front portion), which is one of the portions where the interior angle to be obtained when two adjacent sides meet is no more than 90 degrees and where the two side are connected in a curvature shape. In the front quarter glass 10A, W is in a range of 8-35 mm (0.31-1.38 inches) in a region corresponding to the entire inner periphery of the black ceramic layer 2. In other words, $W_{min}$ is no less than 8 mm, and $W_{max}$ is no more than 35 mm (1.38 inch). As described above, $W_{min}$ is preferably no more than 20 mm (0.79 inch) from the viewpoint of ensuring the anti-fogging performance in a broad range.

In this manner, as the outer periphery of the anti-fogging film 3A is formed into a shape that includes no corner portion having an interior angle of no more than 90 degrees throughout the outer periphery of the anti-fogging film 3A, an advantageous effect of improving the productivity is obtained in an anti-fogging film constituted by an organic resin-based coating film formed with its end portion decoated as will be described later. However, with the shape that includes no corner portion having an interior angle of no more than 90 degrees throughout the outer periphery as in the anti-fogging film 3A, it may not be easy to reduce $W_{max}$.

The outer periphery of the anti-fogging film 3A includes two corner portions a1 and a2 where the interior angle exceeds 90 degrees. However, from the viewpoint of further improving the work efficiency, one or both of the corner portions a1 and a2 included in the outer periphery of the anti-foggingfilm 3A may be changed to have a curvature shape within a range where the distance between the outer periphery of the anti-fogging film 3A and the inner periphery of the black ceramic layer 2 does not exceed 35 mm (1.38 inch). In particular, the workability can be further improved with a configuration that includes no corner portion having an interior angle of no more than 100 degrees throughout the outer periphery of the anti-fogging film. In that case, however, the total area of the anti-fogging film 3A is reduced, and the anti-fogging performance may be reduced accordingly. Therefore, the outer peripheral shape of the anti-fogging film 3A is selected as appropriate in consideration of the balance between the workability in forming the anti-fogging film 3A and the anti-fogging performance.

From the viewpoint of reducing the maximum value $W_{max}$ of the distance between the outer periphery of the anti-fogging film and the inner periphery of the black ceramic layer, it is preferable that an anti-fogging film have an outer peripheral shape that includes a corner portion having an interior angle of no more than 90 degrees throughout the outer periphery of the anti-fogging film, as in an anti-fogging film 3B included in a front quarter glass 10B illustrated in FIG. 2 and described later.

In the front quarter glass 10A, a boundary between a region where the anti-fogging film 3A is provided—i.e., a region where an anti-fogging film is formed—and a region where the anti-fogging film 3A is not formed—i.e., a region where no anti-fogging film is formed—has no perspective distortion and is formed by a boundary line L that has a linewidth of 10-200 µm, the boundary line L being visually recognized by scattering of incoming light.

In the front quarter glass 10A, the entirety of the boundary between the region where the anti-fogging film 3A is formed and the region where the anti-fogging film 3A is not formed, that is, the entirety of the outer periphery of the anti-fogging film 3A is located within the see-through region. As the boundary between the region where the anti-fogging film 3A is formed and the region where the anti-fogging film 3A is not formed is constituted by the boundary line L, high visibility can be ensured.

The front quarter glass 10B illustrated in FIG. 2 includes the window plate 1, the black ceramic layer 2 provided on the vehicle interior side surface of the window plate 1, and the anti-fogging film 3B. In the front quarter glass 10B, the anti-fogging film 3A in the front quarter glass 10A illustrated in FIG. 1 is replaced by the anti-fogging film 3B. In the front quarter glass 10B, the window plate 1 and the black ceramic layer 2 are similar to the window plate 1 and the black ceramic layer 2 in the front quarter glass 10A.

The anti-fogging film 3B has a substantially trapezoidal outer peripheral shape that substantially coincides with a shape obtained by reducing the inner peripheral shape of the black ceramic layer 2. In the front quarter glass 10B, the outer periphery of the anti-fogging film 3B is located 8-35 mm (0.31-1.38 inches) inside from the inner periphery of the black ceramic layer 2 in a region corresponding to the entire inner periphery of the black ceramic layer 2. The outer periphery of the anti-fogging film 3B is preferably located 8-20 mm (0.31-0.79 inches) inside from the inner periphery of the black ceramic layer 2. In these respects, the anti-fogging film 3A and the anti-fogging film 3B are similar.

Herein, the anti-fogging film 3A and the anti-fogging film 3B differ from each other in the outer peripheral shape and, in particular, in the shape of a corner portion. Specifically, while the outer periphery of the anti-fogging film 3A includes no corner portion having an interior angle of no more than 90 degrees, the outer periphery of the anti-fogging film 3B has a corner portion having an interior angle of no more than 90 degrees.

Specifically, the outer periphery of the anti-fogging film 3B is formed by a straight line in a portion where the inner periphery of the black ceramic layer 2 is linear so that the distance between the outer periphery of the anti-fogging film 3B and the inner periphery of the black ceramic layer 2 is substantially constant. In addition, at all four corners where two adjacent sides meet including corner portions (indicated by b1 and b2 in FIG. 2) where the interior angle is no more than 90 degrees and corner portions (indicated by a1 and a2 in FIG. 2) where the interior angle exceeds 90 degrees, the two sides are so connected as to form a corner portion where straight lines intersect with each other.

When the distance between the outer periphery of the anti-fogging film 3B and the inner periphery of the black ceramic layer 2 is denoted by W, a minimum value that W can take is denoted by $W_{min}$, and a maximum that W can take is denoted by $W_{max}$, $W_{min}$ lies in a region corresponding to a straight line portion of the inner periphery of the black ceramic layer 2, as in the case of the anti-fogging film 3A. In the case of the anti-fogging film 3B, $W_{max}$ lies on b1 (lower front portion), which is one of the corner portions where the interior angle obtained as two adjacent sides meet is no more than 90 degrees. This position (lower front portion) is the same as the position indicated with $W_{max}$ in the case of the anti-fogging film 3A. However, $W_{max}$ in the case of the anti-fogging film 3B can be reduced more easily than $W_{max}$ in the case of the anti-fogging film 3A due to the above-described difference in the outer peripheral shape.

Therefore, the area of the anti-fogging film 3B can be made larger than that of the anti-fogging film 3A, and higher anti-fogging performance is likely to be obtained in the front quarter glass 10B than in the front quarter glass 10A. However, when the outer peripheral shape has a corner portion having an interior angle of no more than 90 degrees as in the anti-fogging film 3B, the production efficiency is likely to be reduced, as compared to the anti-fogging film 3A, in an anti-fogging film constituted by an organic resin-based coating film formed with an end portion decoated as will be described later.

Therefore, the outer peripheral shape of the anti-fogging film is selected as appropriate in consideration of the balance between the workability in forming the anti-fogging film and the anti-fogging performance. In the front quarter glass, when the interior angle formed by two adjacent sides is much smaller than 90 degrees as in a case where a triangular window plate is used, the configuration in which the outer periphery of the anti-fogging film includes a corner portion having an interior angle of no more than 90 degrees is advantageous in reducing $W_{max}$.

In the front quarter glass 10B as well, the entirety of the boundary between the region where the anti-fogging film 3B is formed and the region where the anti-fogging film 3B is not formed is located within the see-through region. The entirety of the boundary between the region where the anti-fogging film 3B is formed and the region where the anti-fogging film 3B is not formed has no perspective distortion and is constituted by the boundary line L that has a linewidth of 10-200 µm, the boundary line L being visually recognized by scattering of incoming light. Thus, as in the front quarter glass 10A, in the front quarter glass 10B as well, high visibility can be ensured in the see-through region.

FIG. 3 is a configuration diagram of an example of an embodiment of a front quarter glass according to the present invention, and this front quarter glass includes both a second region where the outer periphery of an anti-fogging film is located 8-35 mm (0.31-1.38 inches) inside from the inner periphery of a black ceramic layer and a first region that includes a lower front portion and where the outer periphery of the anti-fogging film is located on an outer side of a position that is located 8 mm (0.31 inch) inside from the inner periphery of the black ceramic layer.

A front quarter glass 10C illustrated in FIG. 3 includes the window plate 1, the black ceramic layer 2 provided on the vehicle interior side surface of the window plate 1, and an anti-fogging film 3C. In the front quarter glass 10C, the anti-fogging film 3A in the front quarter glass 10A illustrated in FIG. 1 is replaced by the anti-fogging film 3C. In the front quarter glass 10C, the window plate 1 and the black ceramic layer 2 are similar to the window plate 1 and the black ceramic layer 2 in the front quarter glass 10A.

In the front quarter glass 10C, the first region takes up a region corresponding to a portion of the lower side and a portion of the front side each extending from the lower front corner portion of the inner periphery of the black ceramic layer 2. Herein, the first region in the front quarter glass 10C includes a region (hereinafter, referred to as a "first a-region") where the outer periphery of the anti-fogging film 3C is located on an outer side of a position that is located 8 mm (0.31 inch) inside from the inner periphery of the black ceramic layer 2 and located on an inner side of the inner periphery of the black ceramic layer 2 and a region (hereinafter, referred to as an "overlapping region") where the outer periphery of the anti-fogging film 3C is located on the same position as the inner periphery of the black ceramic layer 2 or on an outer side of the inner periphery of the black ceramic layer 2 and on an inner side of the outer periphery of the black ceramic layer 2.

When the front quarter glass according to the present invention includes the first region, the first region may include only the first a-region, may include only the overlapping region, or may include both the first a-region and the overlapping region. The first region preferably includes the overlapping region. The proportion of the overlapping region in the first region is preferably 30-100% or more preferably 50-100% with respect to the proportion of the inner periphery of the black ceramic layer corresponding to the first region.

When the front quarter glass according to the present invention includes the overlapping region, the overlapping region preferably includes at least a portion of a region corresponding to the lower front portion of the inner periphery of the black ceramic layer. Furthermore, the overlapping region preferably takes up a region corresponding to 5-20% of the entire inner periphery of the black ceramic layer. In this case, in correspondence thereto, the first region in the front quarter glass preferably takes up a region corresponding to 10-40% of the entire inner periphery of the black ceramic layer.

With the front quarter glass 10C serving as an example, in FIG. 3, the overlapping region and the first a-region take up regions corresponding to, respectively, 19% and 3% of the entire inner periphery of the black ceramic layer 2. Therefore, the first region takes up a region corresponding to 22% in total of the entire inner periphery of the black ceramic layer 2, and the second region takes up a region corresponding to 78% of the entire inner periphery of the black ceramic layer 2.

When the front quarter glass includes the overlapping region, an overlapping width, which is the distance between the outer periphery of the anti-fogging film and the inner periphery of the black ceramic layer, is preferably 5-20 mm (0.19-0.79 inches) or more preferably 7-17 mm (0.27-0.67 inches )from the viewpoint of the durability of the anti-fogging film and the workability in forming the anti-fogging film, although this overlapping width may vary depending on the width of the black ceramic layer. The distance between the outer periphery of the black ceramic layer and the outer periphery of the anti-fogging film is preferably no less than 2 mm from the viewpoint similar to the above. In the overlapping region, typically, the black ceramic layer and the anti-fogging film are stacked on the window plate in this order.

In a front quarter glass of an embodiment that includes the overlapping region, the position of the overlapping region is not limited to the position indicated in FIG. 3. It suffices that the overlapping region be located in a region that includes at least a portion of a region corresponding to the lower portion of the front side of the black ceramic layer within the first region.

In the front quarter glass according to the present invention, as the first region is included within the above-described range, the anti-fogging performance can be improved while the durability required for the anti-fogging film in the front quarter glass is being ensured.

In the second region of the front quarter glass 10C, when the distance between the outer periphery of the anti-fogging film 3C and the inner periphery of the black ceramic layer 2 is denoted by W, a minimum value that W can take is denoted by $W_{min}$, and a maximum that W can take is denoted by $W_{max}$, $W_{min}$ lies in a region corresponding to a straight line portion of the inner periphery of the black ceramic layer 2. $W_{max}$ lies on an upper rear corner portion where the interior angle obtained when two adjacent sides meet is no more than 90 degrees. $W_{min}$ is no less than 8 mm, and $W_{max}$ is no more than 35 mm. As described above, $W_{min}$ is preferably no more than 20 mm from the viewpoint of ensuring the anti-fogging performance in a broad range.

In the front quarter glass 10C, the outer peripheral shape of the anti-fogging film 3C includes a corner portion having an interior angle of no more than 90 degrees in the second region and includes no corner portion having an interior angle of no more than 90 degrees in the first region. As the anti-fogging film 3C has such an outer peripheral shape, $W_{max}$ in the second region can be reduced easily, and the anti-fogging film 3C is more easily kept from peeling off at its corner portion in the first region and, in particular, in the overlapping region.

In the front quarter glass 10C, the boundary between the region where the anti-fogging film 3C is formed and the region where the anti-fogging film 3C is not formed has no perspective distortion and is constituted by the boundary line L that has a linewidth of 10-200 µm, the boundary line L being visually recognized by scattering of incoming light. Thus, in the front quarter glass 10C, high visibility can be ensured, as in the front quarter glass 10A, in the second region and the first a-region (see-through region). In addition, in the front quarter glass 10C, if the boundary between the region where the anti-fogging film 3C is formed and the region where the anti-fogging film 3C is not formed in the overlapping portion is constituted by the boundary line L identical to the boundary line L in the see-through region, this configuration is advantageous in the workability in forming the anti-fogging film 3C.

As illustrated in FIGS. 1 to 3, the boundary between the region where the anti-fogging film is formed and the region where no anti-fogging film is formed is constituted by the boundary line L that coincides with the outer periphery of the region where the anti-fogging film is formed. The boundary line L is a boundary line having a feature of the present invention. Specifically, the boundary line L has no perspective distortion at a boundary between the aforementioned two regions divided by this boundary line, and the boundary line L has a linewidth of 10-200 µm that is visually recognized by scattering of incoming light.

The boundary line L has no interference with the field of view associated with perspective distortion, and as long as the linewidth of the boundary line L is 10-200 µm, there is almost no influence on the field of view. Furthermore, since the boundary line is formed through processing, this provides a good appearance.

In the present specification, the presence of perspective distortion caused by the boundary line, that is, the presence of perspective distortion on the boundary between the two regions divided by the boundary line is evaluated as described below, and the linewidth of the boundary line that is visually recognized when incoming light is scattered thereby is measured as described below. The linewidth of the boundary line as used in the present specification refers to the linewidth on the boundary line between the region where the anti-fogging film is formed and the region where no anti-fogging film is formed as measured in the method described below, unless indicated otherwise.

(Presence of Perspective Distortion)

Prepared is a test plate A on which a grid pattern of black lines disposed at an interval of 10 mm and each having a width of 0.7 mm is formed on a white background such that each black line is at an angle of 45 degrees relative to the lower side. This test plate A and a front quarter glass are disposed such that the surface of the test plate A on which the grid pattern is formed and the surface of the front quarter glass on which no anti-fogging film is formed are spaced apart by 20 mm from each other and are parallel to each other. With a camera installed at a distance of 150 mm from the surface of the front quarter glass on which the anti-fogging film is formed, an image of the surface of the test plate A on which the grid pattern is formed is captured through the front quarter glass such that the boundary line between the region where the anti-fogging film is formed and the region where no anti-fogging film is formed is located at substantially the center of the imaging area. The obtained image is visually inspected. In a case in which a deformation or a break is observed in the grid pattern, this case is denoted as "perspective distortion is present." In a case in which neither a deformation nor a break is observed, this case is denoted as "no perspective distortion is present."

(Linewidth of Boundary Line)

A test plate B having an entirely black principal surface is prepared. This test plate B and a front quarter glass are disposed such that the black surface of the test plate B and the surface of the front quarter glass on which no anti-fogging film is formed are spaced apart by 20 mm from each other and are parallel to each other. With a camera installed at a distance of 150 mm from the surface of the front quarter glass on which the anti-fogging film is formed, while a space between the test plate B and the front quarter glass is being irradiated with visible light, an image of the black surface of the test plate B is captured through the front quarter glass such that the boundary line between the region where the anti-fogging film is formed and the region where no anti-fogging film is formed is located at substantially the center of the imaging area. The obtained image is magnified by 5×, a maximum linewidth along a 100-mm stretch of the boundary line is measured, and the obtained maximum linewidth serves as the linewidth of the boundary line.

In the front quarter glass according to the present invention, the linewidth of the boundary line is 10-200 µm. As long as the linewidth of the boundary line is within this range, the boundary line can be recognized visually as a boundary at a sufficient level, and the boundary line L has almost no influence on the field of view. In addition, the boundary line L provides design sophistication as it can be visually recognized as an aesthetic line by human perception. The linewidth of the boundary line is preferably 10-150 µm.

Herein, when the front quarter glass according to the present invention includes the overlapping region where the anti-fogging film and the black ceramic layer overlap each other, it is difficult to determine, with the above-described method, the presence of perspective distortion on the boundary line between the region where the anti-fogging film is formed and the region where no anti-fogging film is formed in the overlapping region. In such a case, if no perspective distortion is present on the boundary line between the region where the anti-fogging film is formed and the region where no anti-fogging film is formed within a region continuous with the overlapping region and excluding the overlapping region, that is, in the see-through region and if the linewidth of the boundary line between the region where the anti-fogging film is formed and the region where no anti-fogging film is formed within the overlapping region is 10-200 µm, the boundary line between the region where the anti-fogging film is formed and the region where no anti-fogging film is formed within the overlapping region is regarded as the boundary line L.

The above-described feature of the boundary line L, that is, the feature that the boundary line L has no perspective distortion and has a linewidth of 10-200 µm that is visually recognized by scattering of incoming light will be described with reference to FIG. 4, which illustrates a sectional shape of the boundary line L. FIG. 4 is an enlarged sectional view of the front quarter glass 10A illustrated in FIG. 1, taken in the vicinity of the boundary line L (i.e., an enlarged sectional view taken perpendicularly along a plane extending in the direction of the double-headed arrow (the direction orthogonal to the boundary line L) within the dotted circle indicated in FIG. 1).

In FIG. 4, the anti-fogging film 3A has a two-layer structure including a ground layer 31 located on the side closer to the window plate 1 and an upper layer 32 overlying the ground layer 31 and having anti-fogging functionality. The window plate 1 has a configuration that includes two light-transmissive substrates 11 and 12 sandwiching an intermediate film 13. The side of the window plate 1 where the anti-fogging film 3A is provided is the vehicle interior side, and the black ceramic layer 2 is so formed on the vehicle interior side of the window plate 1 as to have an inner side end surface located at a position spaced apart from an end surface of the anti-fogging film 3A by the distance W. As described above, the distance W is 8-35 mm and is preferably 8-20 mm.

In FIG. 4, A2 denotes the region where the anti-fogging film 3A is formed, A1 denotes the region where the anti-fogging film 3A is not formed, and the boundary line L lies on the boundary between A2 and A1. In FIG. 4, the anti-fogging film 3A formed on the principal surface of the window plate 1 on the vehicle interior side has a film thickness t that is substantially constant in the vicinity of the boundary line L, and the shape of an end surface of the anti-fogging film 3A is substantially perpendicular to the principal surface of the window plate 1.

That the film thickness t of the anti-fogging film 3A is substantially constant in the vicinity of the boundary line L specifically means the following. In a captured image of a section of the front quarter glass 10A cut along a plane orthogonal to the boundary line L, similar to the one illustrated in FIG. 4, a maximum value of the film thickness within a 1-mm range inward from the end surface (at the position of the boundary line L) of the anti-fogging film 3A is regarded as 100%. Then, a value (%) obtained by subtracting, from 100%, the percentage (%) of a minimum value relative to the maximum value is no more than 5%. This value (%) is preferably no more than 2% or more preferably no more than 1%. Hereinafter, the value (%) obtained by subtracting, from 100%, the percentage (%) of the minimum value relative to the maximum value (100%) of the film thickness of the anti-fogging film within a 1-mm range inward from the position of the boundary line L as measured through the foregoing method is referred to as "a deviation of the film thickness at the end portion" of the anti-fogging film. The sectional view illustrated in FIG. 4 is a schematic diagram, and FIG. 4 does not exactly depict the actual shape of the end surface of the anti-fogging film 3A, for example.

In the front quarter glass 10A, as the anti-fogging film 3A is provided on the window plate 1 in a manner illustrated in FIG. 4, for example, the boundary line between the region A1 where the anti-fogging film 3A is not formed and the region A2 where the anti-fogging film 3A is formed can result in the boundary line L having no perspective distortion at the boundary between the aforementioned two regions divided by this boundary line and having a linewidth of 10-200 μm that is visually recognized by scattering of incoming light. A method of so forming the anti-fogging film 3A as to have the above-described shape will be described later.

The sectional view illustrated in FIG. 4 is a sectional view of the front quarter glass 10A taken in the vicinity of the boundary line L. The layered structure of the window plate 1 is similar to the one illustrated in FIG. 4 throughout the front quarter glass 10A. The layered structure of the anti-fogging film 3A is similar to the one illustrated in FIG. 4 throughout the anti-fogging film 3A. Hereinafter, each member constituting the front quarter glass 10A will be described.

The window plate 1 includes the first light-transmissive substrate 11, the second light-transmissive substrate 12 opposing the first light-transmissive substrate 11, and the intermediate film 13 sandwiched by the first light-transmissive substrate 11 and the second light-transmissive substrate 12 and bonding the first light-transmissive substrate 11 and the second light-transmissive substrate 12 together.

The first light-transmissive substrate 11 and the second light-transmissive substrate 12 are each composed of glass or plastics. The first light-transmissive substrate 11 and the second light-transmissive substrate 12 may both be composed of glass or may both be composed of plastics. Alternatively, either one of the first light-transmissive substrate 11 and the second light-transmissive substrate 12 may be composed of glass, and the other one of them may be composed of plastics. Examples of the glass composing the light-transmissive substrate(s) include soda-lime glass, borosilicate glass, non-alkali glass, and silica glass. Examples of the plastics forming the light-transmissive substrate(s) include an acryl-based resin, such as polymethyl methacrylate; an aromatic polycarbonate-based resin, such as polyphenylene carbonate; and an aromatic polyester-based resin, such as polyethylene terephthalate (PET).

In the front quarter glass 10A, the window plate 1 has a configuration in which the two light-transmissive substrates sandwich the intermediate film. The number of light-transmissive substrates constituting the window plate, however, may be one or three or more. When the number of light-transmissive substrates is three or more, it is essential that an intermediate film be provided between every light-transmissive substrate.

In the front quarter glass 10A, the shape of the window plate 1 is substantially trapezoidal as viewed in the front view, but this is not a limiting example. The size and the shape of the window plate 1 are designed as appropriate in accordance with the type of the vehicle in which the front quarter glass is installed. In addition, what can be used for the window plate 1 is not limited to a flat plate, and a window plate that has been so formed as to be bent in a desired curved shape required for a front quarter glass can also be used. The window plate 1 has a thickness of approximately 1-10 mm, for example. The thickness of the window plate 1 is also designed as appropriate in accordance with the type of the vehicle in which the front quarter glass is installed.

As illustrated in FIG. 4, the anti-fogging film 3A of the front quarter glass 10A has a layered structure composed of the two layers—the ground layer 31 and the upper layer 32. The ground layer 31 is a layer that makes contact with the window plate 1. The upper layer 32 is a layer so disposed as to overlie the ground layer 31 and is a layer disposed the farthest from the window plate 1 on the vehicle interior side. The anti-fogging film in the front quarter glass according to the present invention is not limited to a two-layer structure and may have a monolayer structure or a three-layer or higher structure, such as a three-layer structure or a four-layer structure.

With regard to the film thickness of the anti-fogging film 3A, the minimum film thickness of the total film thickness of the ground layer 31 and the upper layer 32 is preferably no less than 5 μm. When the anti-fogging film 3A is constituted by the two layers—the ground layer 31 and the upper layer 32, typically, the ground layer 31 is a layer bonding the upper layer 32 and the window plate 1 together, and the upper layer 32 is an anti-fogging layer that provides the window plate 1 with the anti-fogging functionality. With regard to the film thickness of the anti-fogging film 3A, the total film thickness of the ground layer 31 and the upper layer 32 is preferably 5-30 μm or particularly preferably 7-30 μm. Even when the anti-fogging film is constituted by a single layer or by three or more layers, it is preferable that the film thickness fall within a similar range. However, in order for the anti-fogging film 3A to function as an anti-fogging film, the anti-fogging film includes an anti-fogging layer as an essential layer. When the anti-fogging layer is constituted by two or more layers, the film thickness of the anti-fogging layer is preferably 3-28 μm or more preferably 5-25 μm.

In one specific example of the anti-fogging film 3A, the ground layer 31 and the upper layer 32 are each an organic resin-based coating film. When the anti-fogging layer is formed of an organic resin-based coating film, a water-absorbing resin can be used as the organic resin. Examples of the water-absorbing resin to be used for the anti-fogging layer include an epoxy resin, a urethane resin, and an acrylic resin, and these are all highly transparent.

The black ceramic layer 2 may be obtained as follows. Specifically, powder of a heat-resistant black pigment and low-melting-point glass powder may be mixed into a resin and a solvent and kneaded to obtain a black ceramic paste. This black ceramic paste may be applied to the above-described predetermined region on the vehicle interior side surface of the window plate 1 through printing or the like and baked through heating. The black ceramic layer 2 may be formed as a unitary film that is continuous throughout the layer or may be formed by a dot pattern or the like that is a collection of tiny dots. The thickness of the black ceramic layer 2 formed through the above-described method is preferably approximately 8-20 µm.

Thus far, front quarter glasses according to some embodiments of the present invention have been described with reference to the front quarter glasses 10A to 10C illustrated in FIGS. 1 to 4. The present invention, however, is not limited to these embodiments, and changes and modifications can be made to these embodiments without departing from the spirit and the scope of the present invention.

Hereinafter, described is a method of forming an anti-fogging film having a substantially constant film thickness in the vicinity of the boundary line L and having an end portion shaped such that an end surface is substantially perpendicular to a principal surface of a window plate in a front quarter glass according to an embodiment of the present invention.

An anti-fogging film can be formed on a window plate in a front quarter glass according to an embodiment through, for example, a well-known wet coating technique. In the wet coating technique, a coating liquid that includes a solvent and a component that allows an anti-fogging film to be formed through a reaction, drying, or the like is prepared; this coating liquid is applied onto a surface on which the anti-fogging film is to be formed, that is, onto the principal surface of the window plate of the front quarter glass; and the coating liquid is dried with the solvent being removed therefrom and is allowed for a reaction to form the anti-fogging film.

The wet coating technique is suitable for forming a film having, for example, a uniform and relatively great film thickness of 5-30 µm, which is the film thickness preferable for the anti-fogging film described above. As long as an anti-fogging film having a predetermined film thickness can be formed, the anti-fogging film may also be formed through a dry coating technique. The following description on the method of forming an anti-fogging film is for the wet coating technique, but the technique for decoating an end portion, for example, can also be applied in the dry coating technique.

The coating liquid can be applied onto the principal surface of the window plate through, for example, a flow coating technique, a spin coating technique, a spray coating technique, a flexographic printing technique, a screen printing technique, a gravure printing technique, a roll coating technique, a meniscus coating technique, a die coating technique, or a wipe technique.

When the anti-fogging film is composed of a ground layer and an upper layer, the anti-fogging film may be formed by first applying a coating liquid for forming the ground layer onto the vehicle interior side surface of the window plate and then applying a coating liquid for forming the upper layer over the ground layer.

In such a wet coating technique, the region that is coated with the coating liquid serves as the region where the anti-fogging film is formed. However, at the tip of an end portion of the anti-fogging film obtained by applying the coating liquid and allowing the coating liquid to dry and react, the film thickness gradually decreases typically from the side closer to the center of the region where the anti-fogging film is formed toward the outer peripheral side. How the film thickness gradually decreases at the tip of an end portion of such an anti-fogging film is illustrated, for example, in FIG. 5A described below, as can be seen from the shape of a side surface of the anti-fogging film that has not been decoated. In the front quarter glass provided with the anti-fogging film having an end portion of such a shape, perspective distortion arises if the boundary between the region where the anti-fogging film is formed and the region where no anti-fogging film is formed is present in the see-through region.

Accordingly, in order to suppress perspective distortion that arises at a boundary between the region where the anti-fogging film is formed and the region where no anti-fogging film is formed, the perspective distortion is improved by so processing the sectional shape of the end portion as to have the sectional shape illustrated in FIG. 4, for example. In one example method of processing the end portion of the anti-fogging film, a portion where the film thickness gradually decreases is removed (decoated) up to an end of a region at which the film thickness becomes constant.

Figure 5A:
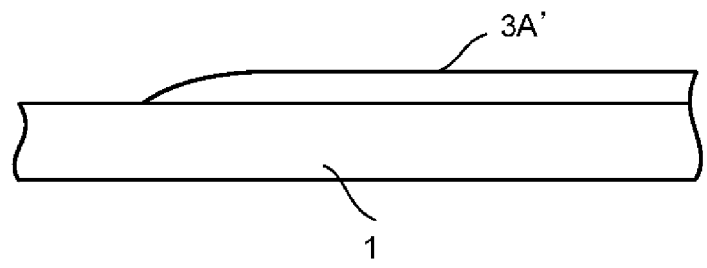
FIGS. 5A, 5B, and 5C are schematic diagrams illustrating a technique for decoating an anti-fogging film in a vehicle front quarter glass according to an example.
Figure 5A:
Figure 5B:
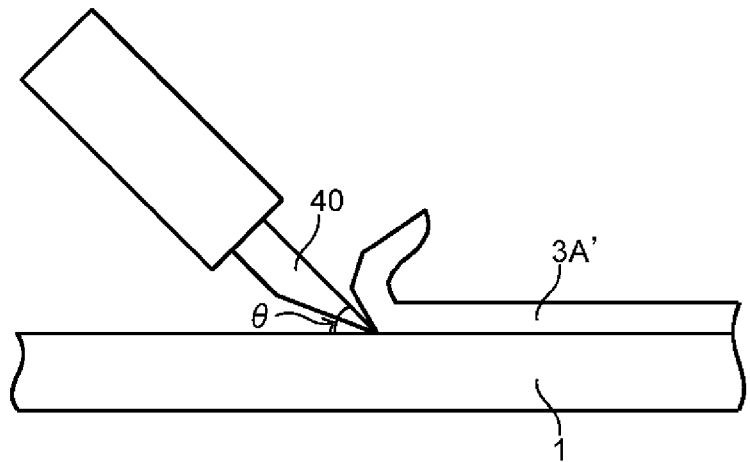
Figure 5B:
Figure 5C:
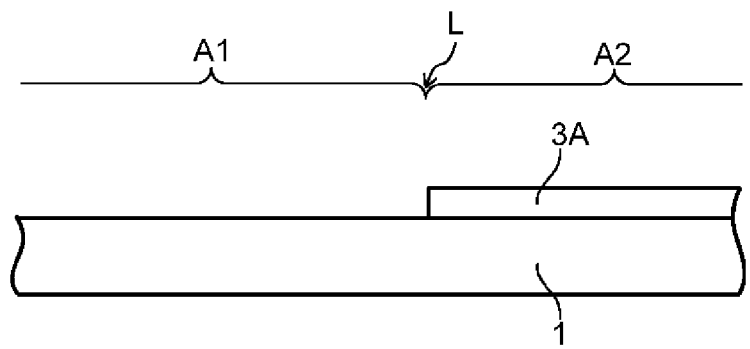

FIGS. 5A, 5B, and 5C are schematic diagrams illustrating a technique for obtaining the front quarter glass 10A illustrated in FIG. 1 by, for example, decoating an end portion of an anti-fogging film formed through the wet coating technique as described above to produce the anti-fogging film 3A having the section illustrated in FIG. 4. In FIGS. 5A, 5B, and 5C, the layered structure of the two layers in the anti-fogging film and the layered structure of the three layers in the window plate 1 are omitted, and the anti-fogging film and the window plate are each depicted as a single layer as a whole. The anti-fogging film that has not gone through decoating is denoted by the reference character 3A'.

FIG. 5A is a side view illustrating a state held when the anti-fogging film 3A' has been formed on the window plate 1 through the wet coating technique but has not been decoated. FIG. 5B is a side view illustrating how a leading end portion of the anti-fogging film 3A' formed on the window plate 1 illustrated in FIG. 5A is decoated with a cutter. FIG. 5C illustrates a side view of the window plate 1 provided with the anti-fogging film 3A, in which a tip portion of the anti-fogging film 3A' has been removed through decoating as illustrated in FIG. 5B and the boundary line L having the feature of the embodiment of the present invention has been formed. FIG. 5C corresponds to the sectional view illustrated in FIG. 4.

The cutter being used in FIG. 5B is, for example, a single-edged cutter 40, and FIG. 5B illustrates a state in which the edge is facing toward the window plate 1. Decoating is performed as described below, for example. Specifically, the single-edged cutter 40 is placed such that the back of the edge of the single-edged cutter 40 that faces the anti-fogging film 3A' is at an angle θ relative to the window plate 1, and the single-edged cutter 40 is inserted along the window plate 1 from the tip of the anti-fogging film 3A' to peel off the anti-fogging film 3A'. In the decoating, the leading end portion of the anti-fogging film 3A' that has been peeled off is removed through an appropriate method. The cutter may be single-edged or double-edged. The angle θ to be held when the cutter is inserted is preferably in a range of 40-70 degrees or more preferably in a range of 50-60 degrees. Setting the angle θ within the stated range makes it easier to adjust the linewidth of the boundary line to 10-200 µm or preferably to 10-150 µm.

The anti-fogging film can be decoated with the use of, for example, a laser, a grinder, sandblast, resin blast, a cutter, or the like. Among the above, the use of a cutter for decoating the anti-fogging film is preferable as it makes the appearance of the boundary line L better as compared to a case in which other means are used.

With regard to a case in which the anti-fogging film is decoated with a cutter when the front quarter glass according to the present invention is to be manufactured, a relationship between the outer peripheral shape of the anti-fogging film and the method of decoating will be described below with reference to FIGS. 6 and 7.

Figure 6:
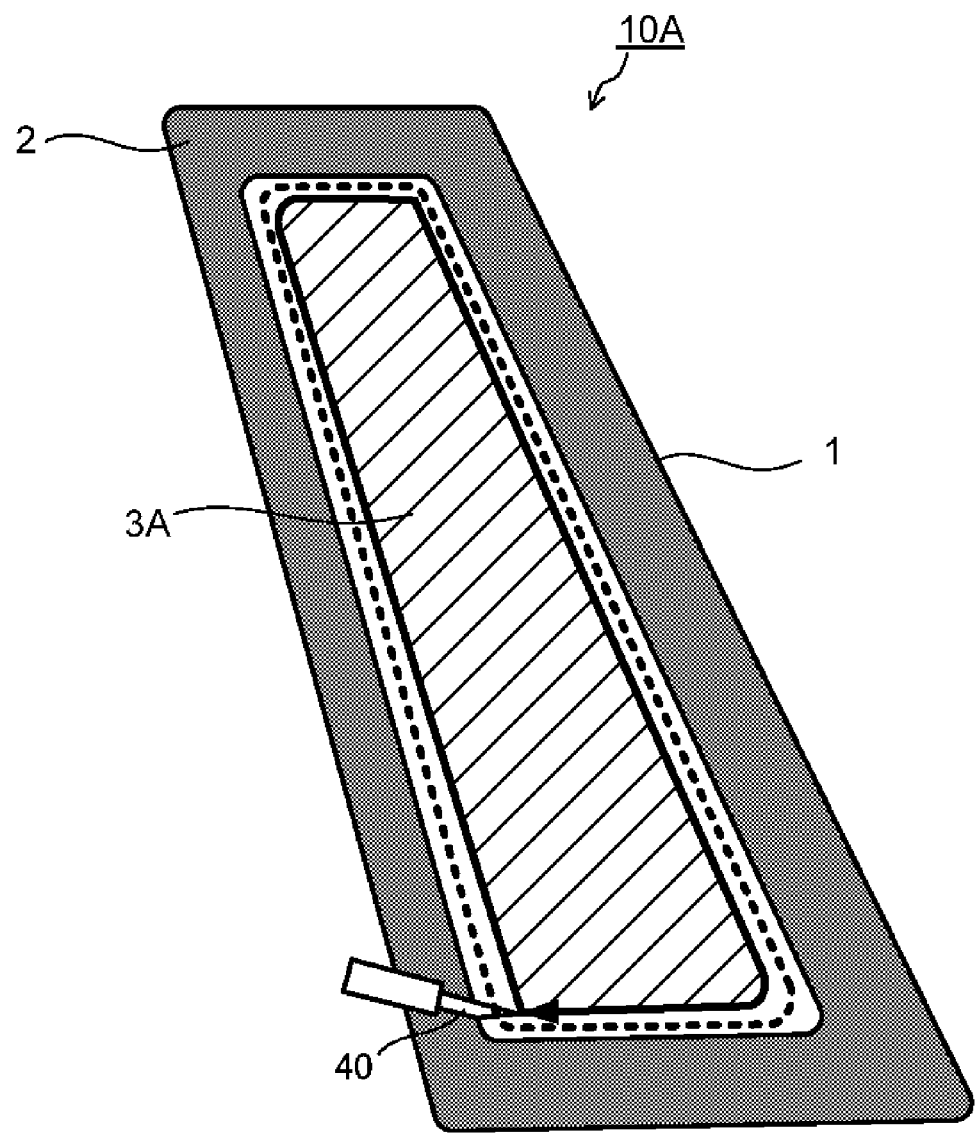
FIG. 6 is a schematic diagram illustrating a technique for decoating an anti-fogging film in the vehicle front quarter glass illustrated in FIG. 1.

FIG. 6 schematically illustrates a process of obtaining the anti-fogging film 3A of the front quarter glass 10A by decoating, with a cutter, an anti-fogging film obtained through a coating technique (hereinafter, also referred to as a "coating anti-fogging film"). The outer peripheral shape of the anti-fogging film 3A includes no corner portion having an interior angle of no more than 90 degrees. FIG. 6 indicates that decoating can be completed with a single instance of continuous movement of the cutter if the outer peripheral shape of the anti-fogging film obtained through decoating includes no corner portion having an interior angle of no more than 90 degrees.

In FIG. 6, for example, at a lower rear corner portion, where the decoating starts, of the coating anti-fogging film obtained through a wet coating technique, the single-edged cutter 40 is inserted against an end portion of the coating anti-fogging film (indicated by the dashed line in FIG. 6) at a predetermined angle θ of, for example, 40-70 degrees, as illustrated in FIG. 5B.

In this state, the single-edged cutter 40 is moved upward, and the single-edged cutter 40 is so moved in the upper rear portion that the outer peripheral shape of the obtained anti-fogging film has a curvature shape of r2. Then, the single-edged cutter 40 is moved forward, and the single-edged cutter 40 is so moved in the upper front portion that the outer peripheral shape of the obtained anti-fogging film has an angular shape of a2. Furthermore, the single-edged cutter 40 is moved downward, and the single-edged cutter 40 is so moved in the lower front portion that the outer peripheral shape of the obtained anti-fogging film has a curvature shape of r1. Lastly, the single-edged cutter 40 is moved rearward to the position where the decoating has started.

In the foregoing, the decoating operation through the movement of the single-edged cutter 40 can be performed continuously, starting from the position where the decoating starts and returning to the same position where it has started through the above-described route. In this manner, decoating of the end portion of the entire outer periphery of the coating anti-fogging film is completed through a single instance of continuous movement of the cutter.

When the anti-fogging film 3A of the front quarter glass 10A is to be obtained through decoating with a single instance of continuous movement of a cutter, the decoating with a single instance of continuous movement of the cutter can be achieved regardless of where on the outer periphery of the obtained anti-fogging film 3A the decoating starts.

Figure 7:
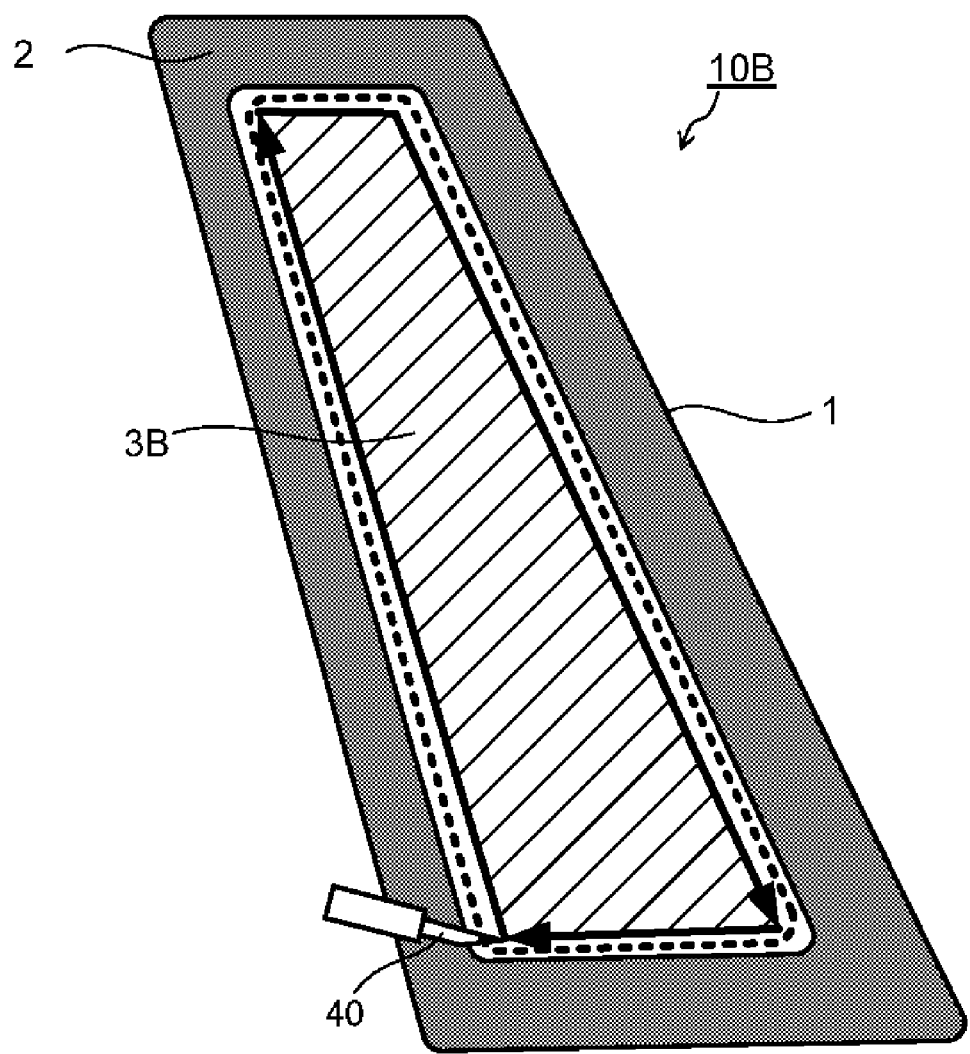
FIG. 7 is a schematic diagram illustrating a technique for decoating an anti-fogging film in the vehicle front quarter glass illustrated in FIG. 2.

FIG. 7 schematically illustrates a process of obtaining the anti-fogging film 3B of the front quarter glass 10B by decoating, with a cutter, a coating anti-fogging film. The outer peripheral shape of the anti-fogging film 3B includes two corner portions (b1 and b2) each having an interior angle of no more than 90 degrees. When the outer peripheral shape of the anti-fogging film includes a corner portion having an interior angle of no more than 90 degrees, unlike in the case of obtaining the anti-fogging film 3A illustrated in FIG. 6, decoating cannot be completed through a single instance of continuous movement of a cutter.

When the outer peripheral shape of the obtained anti-fogging film includes a corner portion having an interior angle of no more than 90 degrees, an operation of changing the direction in which the cutter is moved at that corner portion is added.

In FIG. 7, for example, at a lower rear corner portion, where decoating starts, of the coating anti-fogging film obtained through a wet coating technique, the single-edged cutter 40 is inserted against an end portion of the coating anti-fogging film (indicated by the dashed line in FIG. 7) at a predetermined angle θ of, for example, 40-70 degrees, as illustrated in FIG. 5B.

In this state, the single-edged cutter 40 is moved upward, and upon the single-edged cutter 40 reaching an upper rear portion, the decoating is paused to change the direction of the single-edged cutter 40. Then, the single-edged cutter 40 is moved forward, and the single-edged cutter 40 is so moved in the upper front portion that the outer peripheral shape of the obtained anti-fogging film has an angular shape of a2. Furthermore, the single-edged cutter 40 is moved downward, and upon the single-edged cutter 40 reaching a lower front portion, the decoating is paused to change the direction of the single-edged cutter 40. Then, the single-edged cutter 40 is moved rearward to the position where the decoating has started.

When an operation from the start of decoating up to a point where the direction of the single-edged cutter 40 is changed or an operation from a point where the direction of the single-edged cutter 40 is changed to a point where the direction of the single-edged cutter 40 is changed again is regarded as a single decoating operation, in the decoating illustrated in FIG. 7, three decoating operations are performed to decoat the entire outer periphery of the anti-fogging film. However, in FIG. 7, if the upper rear portion or the lower front portion is the position where the decoating starts, the decoating of the entire outer periphery of the anti-fogging film can be completed in two decoating operations.

In this manner, when the anti-fogging film 3B of the front quarter glass 10B is obtained by decoating the coating anti-fogging film with a cutter, although there is a disadvantage in that the number of decoating operations increases, there is an advantage in that the distance between the outer periphery of the anti-fogging film 3B and the inner periphery of the black ceramic layer can be reduced at a corner portion having an interior angle of no more than 90 degrees.

EXAMPLES

Hereinafter, the present invention will be described in concrete terms with reference to examples, but the present invention is not limited by these examples. In the following examples, with regard to a window plate provided with an anti-fogging film, the characteristics of a boundary line between a region where the anti-fogging film was provided and a region where no anti-fogging film was provided as viewed in the front view were evaluated. In addition, although no black ceramic layer was provided in the following examples, even when a black ceramic layer is provided, the characteristics of the boundary line between a region where the anti-fogging film is provided and a region where no anti-fogging film is provided within the visible region are identical.

Example 1

A laminated glass in which an intermediate film was sandwiched by two glass plates was used as a window plate. An epoxy resin-based anti-fogging film including a ground layer and an upper layer was formed through a wet coating technique throughout a lower portion of the window plate with a predetermined width left above the anti-fogging film to provide a region in an upper portion of a see-through region of the window plate where no anti-fogging film was provided. The obtained anti-fogging film was an anti-fogging film in which the film thickness gradually decreased at a tip of an end portion of the region where the anti-fogging film was formed, similar to the one illustrated in FIG. 5A.

The anti-fogging film had a film thickness of approximately 15 μm in a region where the film thickness was substantially uniform (hereinafter, referred to as "the film thickness of the planar portion") except at the end portion and so on where the film thickness gradually decreased.

At the tip of the end portion where the film thickness of the anti-fogging film formed on the laminated glass as described above gradually decreased, a single-edged cutter was inserted at an angle θ of 40 degrees relative to the glass, as illustrated in FIG. 5B, to peel off the anti-fogging film, and thus the anti-fogging film was decoated up to the position illustrated in FIG. 5C to obtain a laminated glass (A) provided with the anti-fogging film. The obtained laminated glass (A) provided with the anti-fogging film included a region where no anti-fogging film was formed in the upper portion of the see-through region and a region where the anti-fogging film was provided in the lower portion. The boundary between the region where the anti-fogging film was formed and the region where no anti-fogging film was formed was constituted by the boundary line L formed through the above-described decoating.

(Evaluation)

With regard to the boundary line L in the obtained laminated glass (A) provided with the anti-fogging film, the presence of perspective distortion and the linewidth of the boundary line L were measured through the methods described above. In addition, a deviation of the film thickness at the end portion within a 1-mm range inward from the position of the boundary line L in the anti-fogging film was evaluated.

(1) Perspective Distortion

Figure 8A:
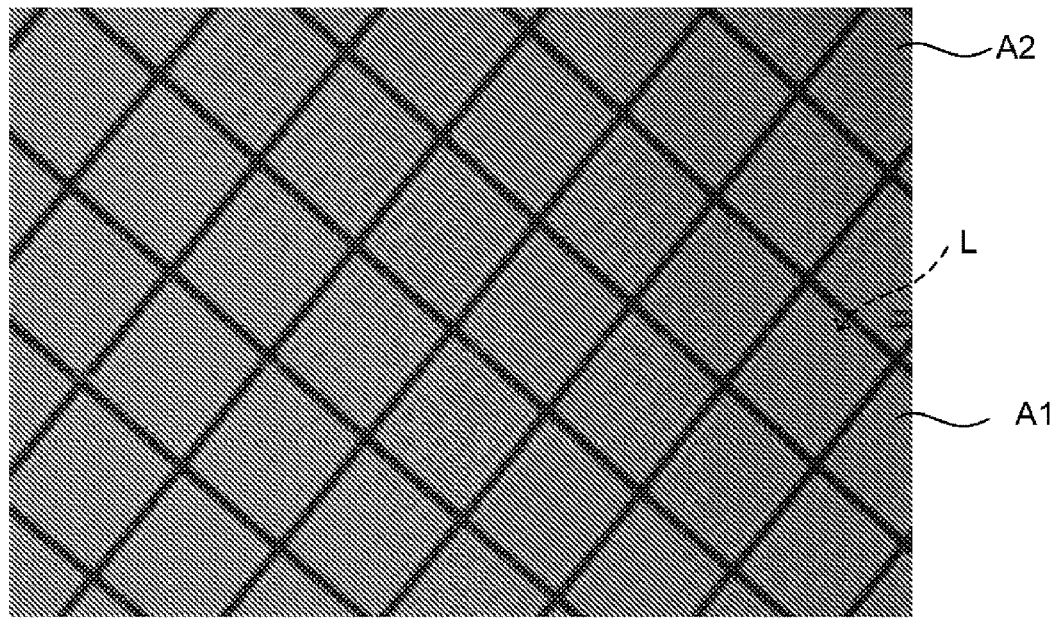
FIG. 8A illustrates an image captured for evaluating perspective distortion in Example 1.
Figure 9A:
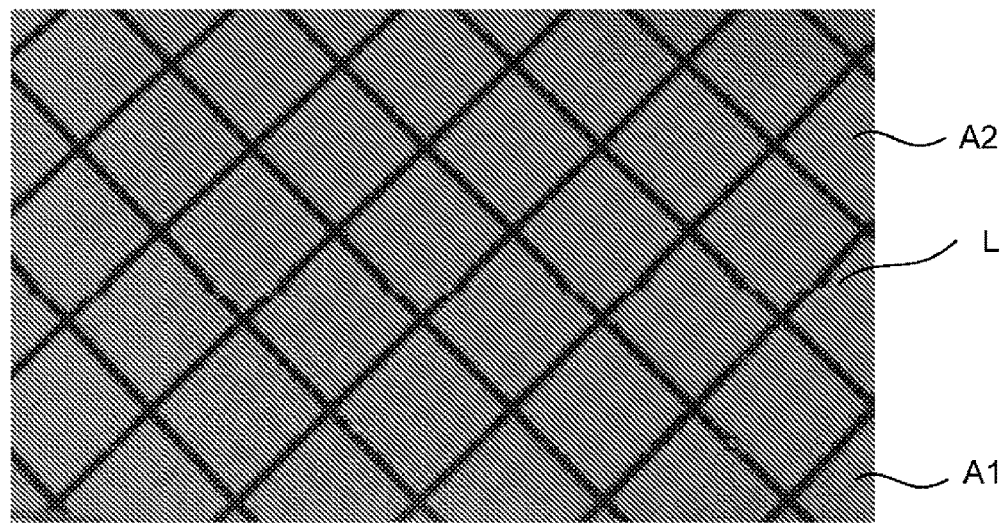
FIG. 9A illustrates an image captured for evaluating perspective distortion in Comparative Example 1.
Figure 10A:
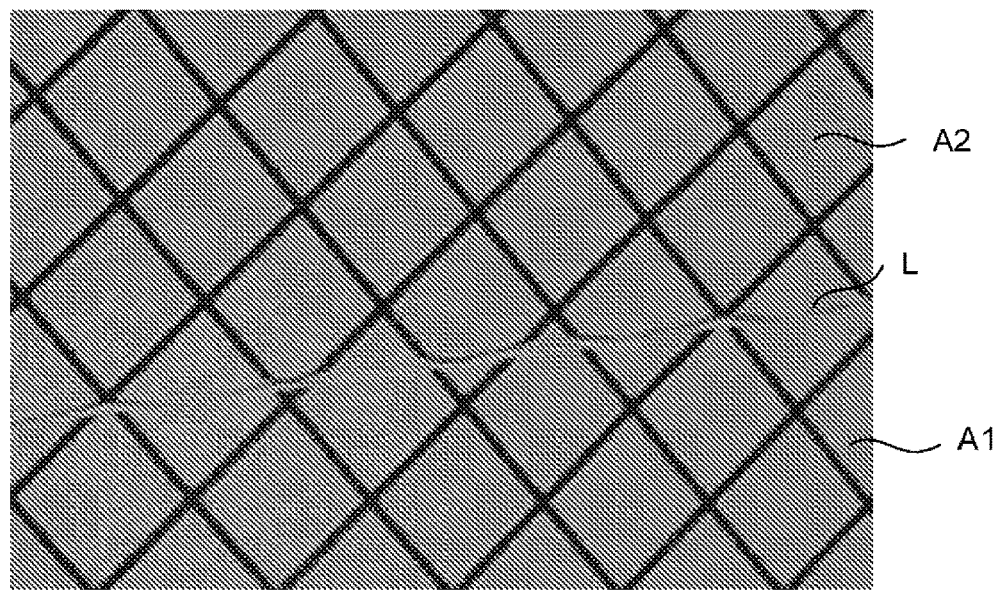
FIG. 10A illustrates an image captured for evaluating perspective distortion in Comparative Example 2.

FIG. 8A illustrates an image captured for determining the presence of perspective distortion in the laminated glass (A) provided with the anti-fogging film. In FIG. 8A, the region where no anti-fogging film is formed is denoted by A1, the region where the anti-fogging film is formed is denoted by A2, and the boundary line L is denoted by L (hereinafter, similar reference characters are used in captured images of examples and comparative examples). With regard to the result, neither a deformation nor a break caused by the boundary line L was observed in the grid pattern, and thus the evaluation indicated that "no perspective distortion was present." In FIG. 8A, the position of the boundary line L is indicated by a dashed arrow, but the boundary line L could not be visually recognized from the image. The boundary line L was so formed as to traverse the image through substantially the center thereof, as can be seen in FIG. 9A or 10A, for example.

(2) Linewidth of Boundary Line L

Figure 8B:
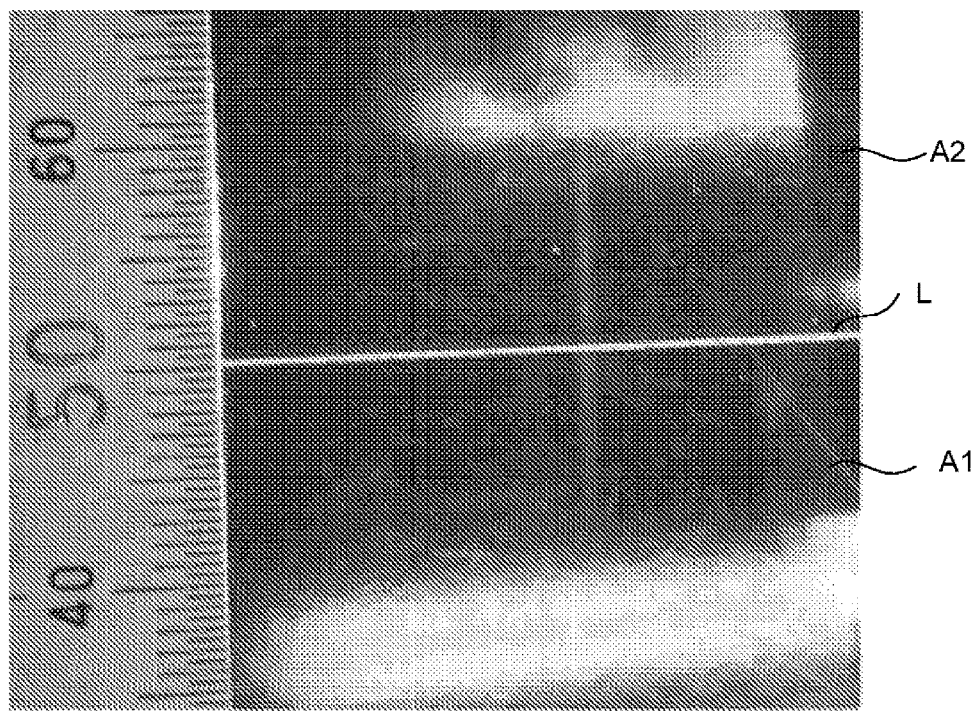
FIG. 8B illustrates an image captured under a condition for measuring a linewidth of a boundary line in Example 1.

From an image of the laminated glass (A) provided with the anti-fogging film captured under the condition for measuring the linewidth described above, the boundary line L was visually recognized as a boundary line having a predetermined linewidth when incoming light is scattered thereby. In addition, from an image of the linewidth of the boundary line L captured through the method similar to that illustrated in FIG. 8B and enlarged by 5×, the maximum value of the linewidth measured in the direction orthogonal to the lengthwise direction within a 100-mm stretch of the boundary line L, that is, the linewidth according to the present invention was 200 μm.

(3) Deviation of Film Thickness at End Portion

With the use of a captured image of a section of the laminated glass (A) provided with the anti-fogging film cut along a plane orthogonal to the boundary line L, the deviation of the film thickness at an end portion, which was a value (%) obtained by subtracting, from 100%, the percentage (%) of a minimum value relative to a maximum value (100%) of the film thickness, was calculated. The obtained value was 0%, and the film thickness was uniform without any deviation.

With regard to the laminated glass (A) provided with the anti-fogging film, the method of processing the end portion of the anti-fogging film and the evaluation result are shown in Table 1. The minimum film thickness in the entire anti-fogging film in the laminated glass (A) provided with the anti-fogging film was equal to the minimum film thickness at an end portion within a 1-mm range from the edge, and this relationship applied similarly in a laminated glass provided with an anti-fogging film according to each of the examples described below.

Comparative Example 1

A laminated glass (B) provided with an anti-fogging film in which the tip of the end portion of the anti-fogging film where the film thickness gradually decreased according to Example 1 described above was not decoated was evaluated on the above (1) and (3) in a manner similar to Example 1 described above.

Figure 9B:
FIG. 9B illustrates an image captured under a condition for measuring a linewidth of a boundary line in Comparative Example 1.

FIG. 9A illustrates an image captured for determining the presence of perspective distortion in the laminated glass (B) provided with the anti-fogging film, and FIG. 9B illustrates an image of the laminated glass (B) provided with the anti-fogging film captured under the condition for measuring the linewidth described above. From these captured images, it was possible to confirm that the perspective distortion caused by the boundary line L was present in the laminated glass (B) provided with the anti-fogging film and that the boundary line L was not visually recognized as a boundary line having a predetermined linewidth when incoming light is scattered thereby. In addition, the tip of the end portion had the shape illustrated in FIG. 5A, and the minimum value of the film thickness could not be measured. Thus, for the deviation of the film thickness at the end portion, the minimum value of the film thickness was calculated as the film thickness of the ground layer. The result was 80%. These results are shown in Table 1.

Comparative Example 2

An anti-fogging film was formed in a manner similar to Example 1 except that a portion corresponding to the first region of the laminated glass was masked with the use of a masking tape having a thickness of 25 μm in Comparative Example 2. Thereafter, the masking tape was peeled off, and a laminated glass (C) provided with an anti-fogging film according to Comparative Example 2 (film thickness at planar portion: approximately 17 μm) was obtained. The obtained laminated glass (C) provided with the anti-fogging film was evaluated on the above (1) and (3) in a manner similar to Example 1 described above.

Figure 10B:
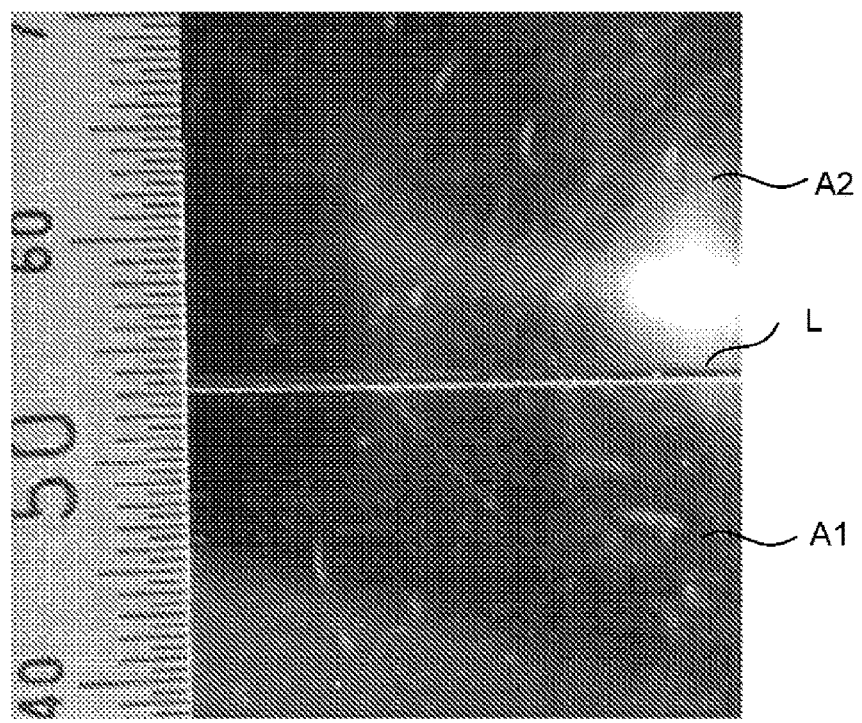
FIG. 10B illustrates an image captured under a condition for measuring a linewidth of a boundary line in Comparative Example 2.

FIG. 10A illustrates an image captured for determining the presence of perspective distortion in the laminated glass (C) provided with the anti-fogging film, and FIG. 10B illustrates an image of the laminated glass (C) provided with the anti-fogging film captured under the condition for measuring the linewidth described above. From these captured images, the perspective distortion caused by the boundary line L was present in the laminated glass (C) provided with the anti-fogging film, and the boundary line L was visually recognized as a boundary line having a predetermined linewidth when incoming light is scattered thereby. Here, aside from the boundary line that scattered the light, a state of the boundary line being curved outward toward the second region could also be observed along the boundary line. With regard to the laminated glass (C) provided with the anti-fogging film, the film thickness of the anti-fogging film was maximum at the end surface at the position of the boundary line L and gradually decreased toward the inner side, and the deviation of the film thickness at the end portion was 71%.

With regard to the laminated glass (C) provided with the anti-fogging film, the method of processing the end portion of the anti-fogging film and the evaluation result are shown in Table 1.

TABLE 1

| Example | Processing on End Portion | Processing Method | Film Thickness of Planar Portion [μm] | Perspective Distortion | Linewidth of Boundary Line L [μm] | Film Thickness of End Portion within 1-mm Range | | Deviation of Film Thickness at End Portion [%] |
|---|---|---|---|---|---|---|---|---|
| | | | | | | Minimum Film Thickness [μm] | Maximum Film Thickness [μm] | |
| Example 1 | Decoat | Single-edged Cutter θ = 40° | Approx. 15 | Not Present | 200 | 15 | 15 | 0 |
| Comparative Example 1 | None | — | Approx. 15 | Present | None | 3 | 15 | 80 |
| Comparative Example 2 | Masking | Tape Thickness 25 μm | Approx. 17 | Present | 1000 or more | 17 | 61 | 71 |

What is claimed is:

1. A vehicle front quarter glass, comprising:
    a window plate;
    a frame-shaped black ceramic layer provided in a peripheral portion of a vehicle interior side surface of the window plate as viewed in a front view; and
    an anti-fogging film provided in a region excluding an entirety of the peripheral portion of the window plate as viewed in the front view, wherein
    a boundary between the region where the anti-fogging film is provided and a region where the anti-fogging film is not provided has no perspective distortion and is formed by a boundary line having a linewidth of 10-200 μm (0.000393701-0.00787402 inches), the boundary line being visually recognized by scattering of incoming light,
    an outer periphery of the anti-fogging film is located on an outer side of a position that is located 8 mm (0.31 inch) inside from an inner periphery of the black ceramic layer in a first region, the first region including an area of the inner periphery of the black ceramic layer that is located in a lower front portion thereof when the vehicle front quarter glass is installed in a vehicle, the first region corresponding to less than 50% of an entire inner periphery of the black ceramic layer, and
    the outer periphery of the anti-fogging film is located 8-35 mm (0.31-1.38 inches) inside from the inner periphery of the black ceramic layer in a second region, the second region being the entire inner periphery of the black ceramic layer excluding the first region.

2. The vehicle front quarter glass according to claim 1, wherein the outer periphery of the anti-fogging film includes no corner portion having an interior angle of no more than 90 degrees.

3. The vehicle front quarter glass according to claim 1, wherein the outer periphery of the anti-fogging film includes a corner portion having an interior angle of no more than 90 degrees.

4. The vehicle front quarter glass according to claim 1, wherein the outer periphery of the anti-fogging film is located 8-20 mm (0.31-0.79 inches) inside from the inner periphery of the black ceramic layer in the second region.

5. The vehicle front quarter glass according to claim 1, wherein the first region is a region corresponding to no less than 1% of the entire inner periphery of the black ceramic layer.

6. The vehicle front quarter glass according to claim 1, wherein a region including a region corresponding to the lower front portion of the inner periphery of the black ceramic layer includes an overlapping region of the anti-fogging film and the black ceramic layer in which the outer periphery of the anti-fogging film coincides with the inner periphery of the black ceramic layer or the outer periphery of the anti-fogging film is located on an inner side of an outer periphery of the black ceramic layer and on an outer side of the inner periphery of the black ceramic layer.

7. The vehicle front quarter glass according to claim 6, wherein the overlapping region corresponds to 5-20% of the entire inner periphery of the black ceramic layer.

* * * * *